(12) United States Patent
Ben-Dov et al.

(10) Patent No.: US 7,249,002 B1
(45) Date of Patent: Jul. 24, 2007

(54) DIRECT RELATIVE MOTION MEASUREMENT FOR VIBRATION INDUCED NOISE AND DRIFT CANCELLATION

(75) Inventors: Yuval Ben-Dov, Los Altos, CA (US); Michael Weber-Grabau, Sunnyvale, CA (US)

(73) Assignee: KLA-Tencor Technologies Corporation, Milpitas, CA (US)

(*) Notice: Subject to any disclaimer, the term of this patent is extended or adjusted under 35 U.S.C. 154(b) by 241 days.

(21) Appl. No.: 10/929,260

(22) Filed: Aug. 30, 2004

(51) Int. Cl.
*G06F 15/00* (2006.01)
*G01N 13/12* (2006.01)
*G01N 13/16* (2006.01)
*G01N 13/20* (2006.01)

(52) U.S. Cl. .................. 702/195; 73/1.82; 73/105; 73/649; 702/97; 702/190; 702/191

(58) Field of Classification Search .................. 73/1.79, 73/1.82, 1.89, 105, 866.1, 866.5; 702/94, 702/95, 97, 105, 189–197; 250/306
See application file for complete search history.

(56) References Cited

U.S. PATENT DOCUMENTS 5,610,846 A * 3/1997 Trapet et al. .................. 702/95
6,308,557 B1 10/2001 Heiland .......................... 73/105
6,510,363 B1 * 1/2003 Hidaka et al. ............... 700/195
7,055,367 B2 * 6/2006 Hajdukiewicz et al. ...... 73/1.79

FOREIGN PATENT DOCUMENTS

WO    WO 200204883 A1 *  1/2002

* cited by examiner

*Primary Examiner*—Hezron Williams
*Assistant Examiner*—David A. Rogers
(74) *Attorney, Agent, or Firm*—Joshua D. Isenberg; JDI Patent

(57) ABSTRACT

A surface analysis apparatus and a method for compensating for mechanical vibrations and drifts in a surface analysis instrument are disclosed. A probe that is sensitive to the distance between the probe and a sample surface provides a probe signal. The probe signal contains information about the surface properties and noise due to changes in the probe-surface distance. A sensor measures a displacement between a probe and the sample surface. The sensor is substantially insensitive to the surface properties measured by the probe. The displacement measurement can be used to compensate for the noise in the probe signal.

25 Claims, 3 Drawing Sheets

DIRECT RELATIVE MOTION MEASUREMENT FOR VIBRATION INDUCED NOISE AND DRIFT CANCELLATION

FIELD OF THE INVENTION

This invention generally relates to surface analysis and more specifically to compensation of mechanical vibration and/or drift in a surface analysis instrument.

BACKGROUND OF THE INVENTION

High-resolution techniques for surface analysis such as atomic force microscopy (AFM) and scanning tunneling microscopy (STM) have achieved great importance in recent years, particularly in the high-resolution investigation of semiconductor wafers. Such techniques rely on the interaction between a sharp tip and the surface of an underlying specimen. The topography of a specimen can easily be surveyed, or locally resolved bonding conditions, for example of macromolecules, can be disclosed. With AFM and STM, resolutions down to the nanometer or sub nanometer range may be attained. Due to the high sensitivity of such techniques, the actual resolving ability of AFM and STM instruments depends strongly on external effects from the surroundings. Examples of such external effects include mechanical vibrations, for example, air vibrations or also bodily vibrations in the instrument or a support for the specimen, which can be produced, e.g., by movements of the building. Vibrations decrease signal to noise ratio. The high resolution of the devices can thus be only used when the disturbing effect is sufficiently reduced or compensated for.

In the prior art, active or passive vibration damping or vibration isolating devices have been used. However, such devices are often very expensive. Furthermore, particularly at very low disturbing frequencies, such as can arise, for example, from temperature instability, these devices offer only a limited protection.

U.S. Pat. No. 6,308,557 to Heiland describes a technique for compensation of vibration in a scanning microscope. Heiland's microscope, which scans in a raster mode, includes a sensor that senses mechanical vibrations and drives a filter whose output is connected to an adder together with the output of the device for producing a signal for adjusting the distance between a specimen and a scanning sensor. The output of the adder controls a device that changes the distance between the specimen and a signal sensor on the microscope head to compensate for the disturbing effects of mechanical vibrations on the signal sensor.

Although the above-described prior art technique works reasonably well in compensating for vibration, it suffers from certain drawbacks that limit its performance in lower frequencies changes such as temperature-induced drift. Thus, there is a need in the art, for a vibration compensation technique that overcomes these disadvantages.

BRIEF DESCRIPTION OF THE DRAWINGS

Other objects and advantages of the invention will become apparent upon reading the following detailed description and upon reference to the accompanying drawings in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

INTRODUCTION

In a scanning probe surface analysis system, the signal from the probe depends on the relative distance between the probe and the surface under analysis. The probe is usually mounted to a scanning head that is, in turn, mounted to a microscope table through supports that suspend the scanning head over the sample. In a system like that described in U.S. Pat. No. 6,308,557, the vibration sensor is located on the microscope table. Unfortunately, although vibrations of the microscope table have an effect on the distance between the table and probe tip, the displacement variations are obtained by significant manipulation of the sensor signal which makes the correction more difficult and thus limited.

Embodiments of the present invention overcome disadvantages associated with the prior art by a compensation technique in which a sensor directly measures changes in the distance between the scanning head and a sample surface. This direct measurement can be used to compensate for vibration or drift. According to an embodiment of the invention, a method for noise compensation in a scanning probe system may be implemented as follows. A probe provides a probe signal that depends on a distance between the probe and a sample surface. The probe signal therefore contains information about the sample surface as well as noise due to random variations in the distances between the probe and the surface. A separate sensor measures a displacement signal that reflects the displacement of the sample surface relative to the probe. The sensor is relatively insensitive to properties that the probe is measuring. The displacement signal includes the noise, but not the information about the sample. The displacement signal can be used to cancel out the effects of random displacement variations of the sample relative to the probe.

Figure 1A:
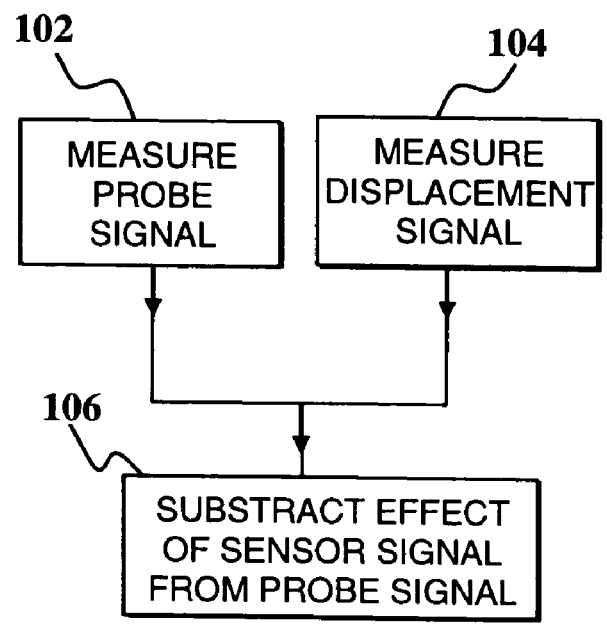
FIGS. 1A–1B are flow diagrams illustrating implementations of a method for vibration compensation according to an embodiment of the present invention.
Figure 1B:
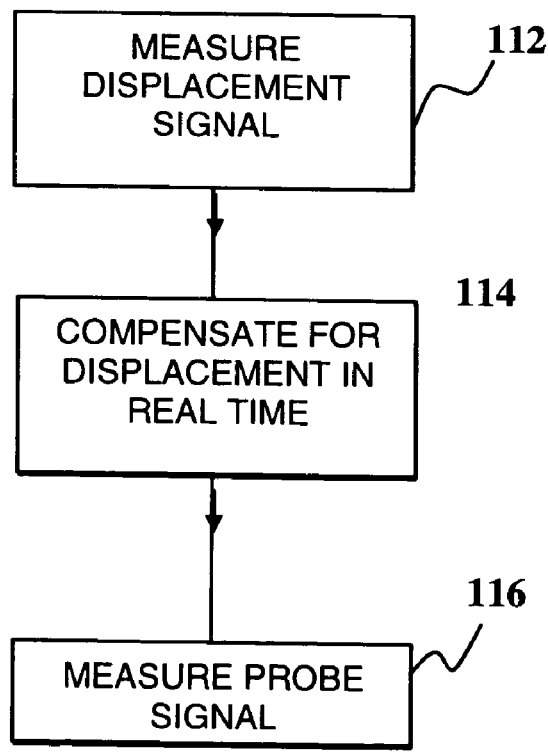

The flow diagrams of FIGS. 1A–1B illustrate two different implementations of this embodiment. In FIG. 1A, the probe measures the probe signal at 102, while the sensor separately measures the sensor signal at 104. Then at 106 the effect of the sample displacement (based on the sensor signal) is subtracted from the measured probe signal. This implementation can be implemented in hardware before data is collected, or in software after data from the probe and sensor have been collected. The corrected probe signal can then be used to image the sample surface. Compensation of the type shown in FIG. 1A is referred to herein as outside-the-loop compensation.

Compensation of the type shown in FIG. 1B is referred to herein as in-the-loop compensation. In FIG. 1B, the sensor signal is measured at 112. The sensor signal is then used at 114 to compensate for movement of the sample in real time. When the probe signal is measured at 116 the effects of sample displacement have already been taken into account.

There are several ways to compensate for sample movement in real time. For example, in a constant height mode, an AFM maintains the height based on a signal from the AFM tip—the z-motion is a function of the tip signal in a closed loop. The voltage applied to the mechanism (e.g., a piezo-crystal) controlling the z-motion in this case is used as the measured height signal. In case of vibration the loop will move the tip to compensate for the displacement variation as well as changes in topography as the tip scans across a sample. By appropriately combining the sensor signal (or some function of it) with the probe signal the loop will not have to compensate for this displacement, thus the applied Z voltage will be less sensitive to displacement variations.

Alternatively, an analog signal from the probe may represent both the topography of the sample and also the displacement variation. By subtracting the sensor signal (or some function of it) the resulting signal will be less sensitive to displacement variation (ideally not sensitive at all). This step can also be performed after sampling the two signals.

FIGS. 1A–1B illustrate two possible implementations of the method. Other implementations within the scope of the above teachings are possible. For example, outside-the-loop compensation may be combined with in-the-loop compensation in the same system.

Figure 2A:
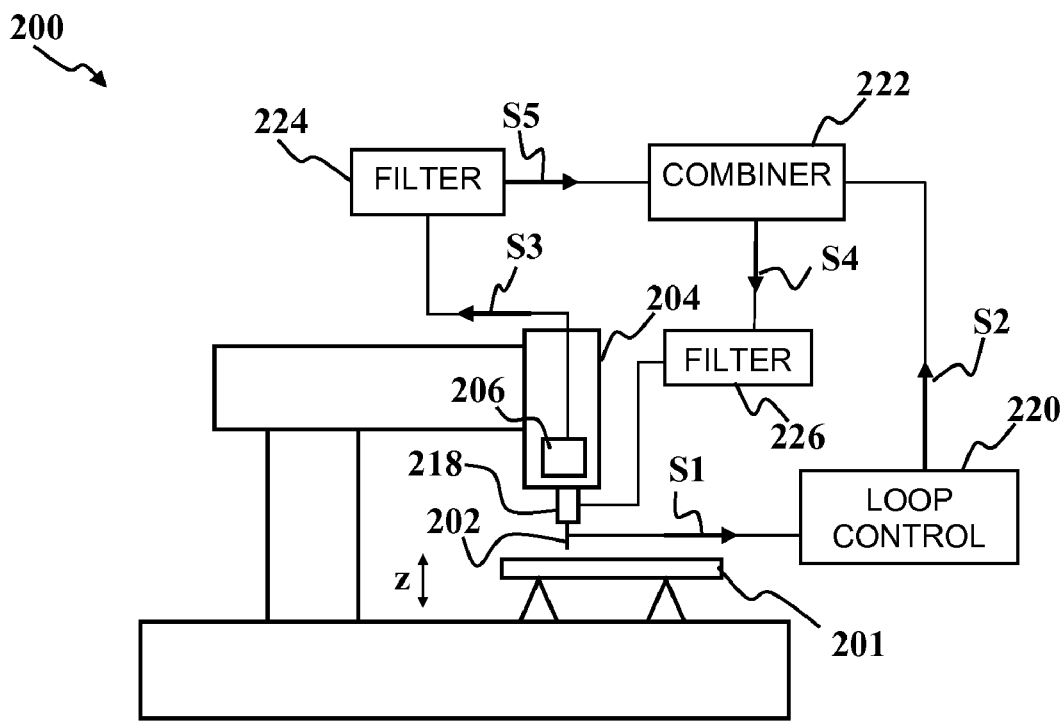
FIG. 2A is a schematic diagram of a surface analysis apparatus according to another embodiment of the present invention.

According to another embodiment of the present invention, a surface analysis apparatus 200 may be configured as depicted in FIG. 2A. The apparatus 200 generally includes a probe 202 that provides a probe signal S1 that depends on the distance of the probe 202 from a surface of a sample 201. The signal S1 includes information about properties of the surface of the sample 201 and noise due to displacement of the sample 201 relative to the probe 202. The probe may be mounted to a probe head 204. Many different types of surface probes may be used with embodiments of the present invention. For example, the probe 202 may be an atomic force microscope probe, an electron tunneling, optical tunneling, van der Waals or similar microscope probe.

A sensor 206 measures relative displacement between the probe 202 and the surface of the sample 201 and produces a displacement signal S3. The sensor 206 is relatively insensitive to properties measured by the probe 202. The sensor 206 may be mounted to the probe head 204. In general, the sensor 206 may be of a type that measures the distance between the probe head 204 and the surface of the sample 201. By way of example, the sensor 206 may be a capacitance sensor, an optical sensor, eddy current sensor, interferometric sensor or other type of displacement sensor.

Figure 2B:
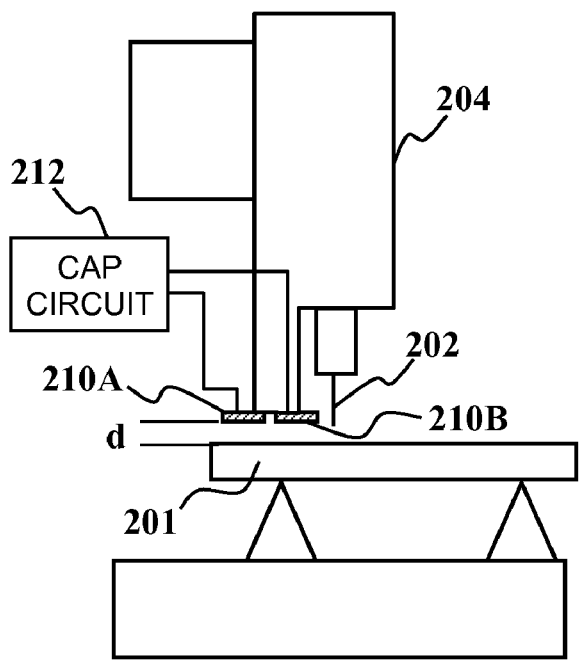
FIG. 2B is a schematic diagram illustrating an example of a surface analysis system using a capacitive sensor according to an embodiment of the present invention.

By way of example, as depicted in FIG. 2B, a capacitance sensor may include two conductive plates a sensor mounted on the probe head 204. As shown in FIG. 2B, the sensor may include two conductors 210A, 210B that are electrically isolated from each other. The electrical capacitance between the conductors 210A, 210B varies when a conductive material is nearby. A capacitance measurement circuit 212 measures the displacement between the sensor and the surface of the sample 201 based on changes in the capacitance between the conductors 210A, 210B as the probe head 204 moves relative to the sample 201. Mechanical vibrations affecting the probe-surface distance also affect a distance d between the sensor and the sample surface.

Figure 2C:
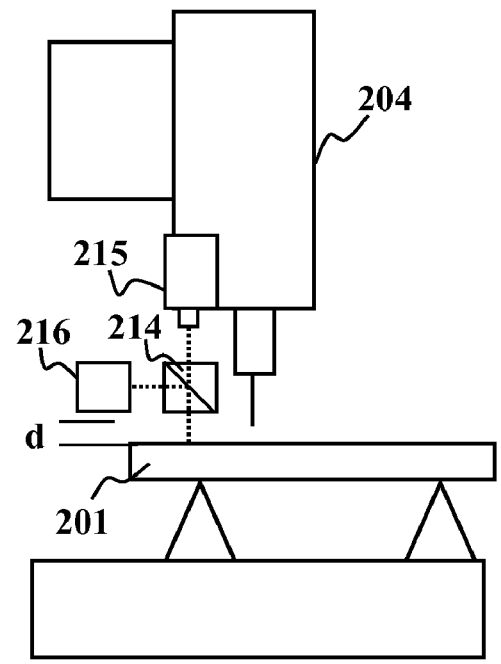
FIG. 2C is a schematic diagram illustrating an example of a surface analysis system using an interferometric sensor according to an embodiment of the present invention.

FIG. 2C illustrates an example of the use of an interferometric sensor as the sensor 206. A beam splitter 214 is mounted to the probe head 204 a light source 215 and the sample surface. The light source (e.g., a laser) directs a beam of light toward the sample 201. The light reflects off the sample surface and the beamsplitter 214 and is collected by an optical detector 216. The reflections produce an optical interference with a reference beam at the detector that depends on a distance d' between the beamsplitter 214 and the sample surface. The sensitivity of an interferometric sensor of the type shown in FIG. 1C depends on the wavelength of the light 215. In general, smaller changes can be detected using shorter wavelengths.

The apparatus 200 may optionally further include a scanning mechanism 208 that displaces the sample 201 and the probe 202 relative to each other. In the example depicted in FIG. 2A, the scanning mechanism 208 is mounted to the support table. The scanning mechanism 208 may impart x-y motion to the sample 201 in a plane substantially parallel to the surface of the sample. The scanning mechanism 208 may optionally move the sample 201 in a z-direction that is substantially perpendicular to the x and y directions. Alternatively, the scanning mechanism may be mounted to the probe head 204 to impart x-, y-, and z-axis motion to the probe 104.

A particular example of vibration compensation according to embodiments of the present invention, e.g., in an apparatus of the type depicted in FIG. 2A, may proceed as follows. A probe signal S1 is measured with the probe 202. As described above, the probe signal S1 depends upon a distance between the probe 202 and a sample surface. The probe signal S1 includes information about the sample surface and noise due to random motion of the sample 201. An adjustment signal S2 may be generated based on the probe signal S1. The nature of the adjustment signal S2 may depend on the nature of the probe. For example, many scanning probe microscopes mount a probe tip to a piezoelectric crystal (or other motion control) that moves the probe tip towards or away from the surface of the sample. When the microscope is operated in a constant signal feedback mode the signal from the probe tip is kept constant by applying a voltage to the piezoelectric crystal to move the tip in the z-direction toward or away from the surface. The voltage applied to the piezoelectric crystal provides the signal that is used to image the sample as the sample and tip are scanned in the x-y plane relative to each other. In other embodiments, e.g., in a constant height mode, the signal from the probe itself may be used to provide the adjustment signal S2.

To operate in a constant signal mode, the apparatus 200 may include a compensation mechanism 218 coupled to the probe 202 and/or sample. The compensation mechanism 218 changes the distance between the sample and the probe 202. A loop control 220 may be connected to the probe 202. The loop control 220 (e.g., a digital signal processor) generates the adjustment signal S2 in response to changes in the probe signal S1. Ordinarily, this adjusting signal would be coupled to the compensation mechanism 218 to adjust the distance between the probe 202 and the sample 201 so that the probe signal remains substantially constant. In FIG. 2A, the compensation mechanism 220 is depicted as being coupled to the probe head. Alternatively, the compensation mechanism 218 may move the sample 201 in the, x-, y- and/or z directions relative to the probe 202. Furthermore, the compensation mechanism 218 may implement motion of both the probe 202 and the sample 201.

As described above, the adjustment signal S2 includes both sample surface information and noise and the displacement signal S3 includes primarily just the noise. The adjustment signal S2 and displacement signal S3 can be combined in such a way that the noise is largely left out. For example, the apparatus 200 may include a combiner 222. The combiner 222 has inputs that receive the adjustment signal S2 and the displacement signal S3 (or functions derived from these signals). The combiner 222 combines the adjustment signal S2 with the displacement signal S3 to produce a combination signal S4 may be used to provide vibration and/or drift compensation. The combiner 222 may perform a simple addition, subtraction, or other suitable combination of the adjustment signal S2 and the displacement signal S3 to produce the combination signal S4.

The combiner 222 may be a stand-alone device such as a digital signal processor (DSPs) or application specific integrated circuit (ASIC). Alternatively, the combiner 222 may be a general-purpose computer programmed with software to implement the combination of the adjustment signal S2 and displacement signal S3 as a sequence of computer readable instructions.

There are a number of ways of using the combination signal S4 to compensate for variation in the probe-sample displacement. For example, combiner may subtract the displacement signal from the compensation signal S2 to provide the combination signal S4. This substantially removes noise due to sample displacement from the compensation signal S2. The combination signal S4 (or a function derived from it) may be coupled to the compensation mechanism 218. Thus, the combination signal S4 may drive the compensation mechanism. Alternatively, compensation signal S2 may drive the compensation mechanism and the combination signal S4 may be used to generate an image.

There are a number of different ways to use displacement signal S3 to compensate for noise present in the adjustment signal S2 or probe signal S1. For example, in cases of in-the-loop compensation the probe-surface distance may be adjusted in real time by some combination of the adjustment signal S2 and the displacement signal S3. Specifically, the position of the probe 202 may be adjusted by real time feed forward to the compensation mechanism 218. The real time feed forward may be used to keep the probe 202 in a substantially constant displacement relative to the surface of the sample 201. To implement this, the output of the combiner 222 may be coupled to the compensation mechanism 218 such that the combination signal S4 drives the compensation mechanism 218.

Figure 3A:
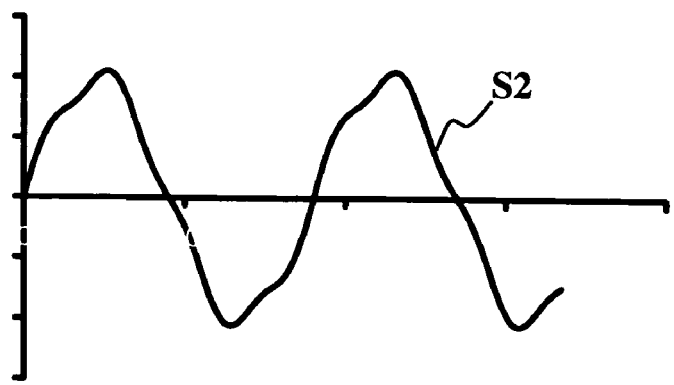
FIG. 3A is a graph depicting a raw probe adjustment signal.
Figure 3B:
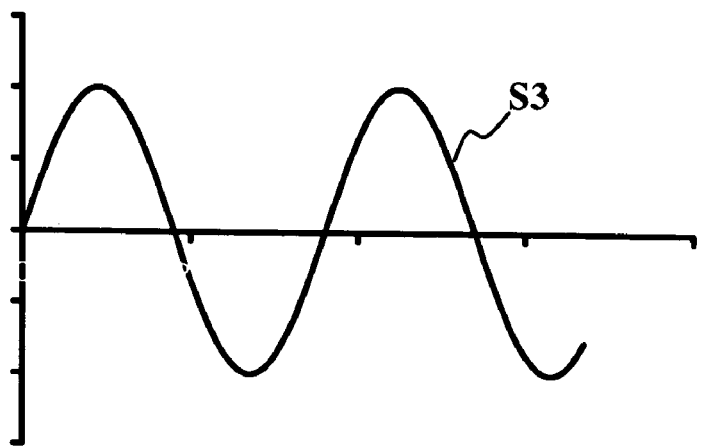
FIG. 3B is a graph depicting a signal from a sensor having a high coherence with changes in a distance between a probe and a sample surface.
Figure 3C:
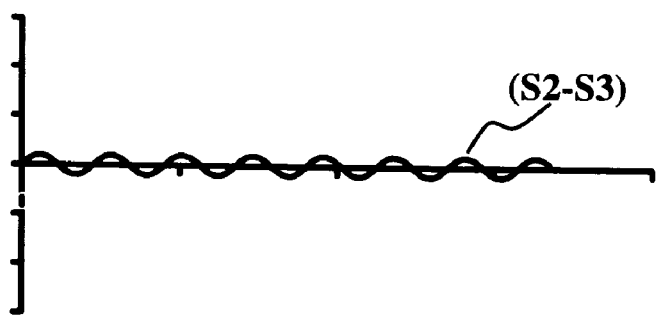
FIG. 3C is a graph depicting a difference between the signal of FIG. 3A and the signal of FIG. 3B.

Alternatively, in outside-the-loop compensation, the displacement signal S3 may be subtracted electronically, (e.g., in a digital or analog device) from the adjustment signal S2 and the difference (S2–S3) may be used to image the sample surface. The subtraction may take place in conjunction with adjustment by the compensation mechanism 218 or independent of it. For example, as depicted in FIGS. 3A–3C, the displacement signal S3 may be subtracted as part of an image analysis. FIG. 3A illustrates the raw adjustment signal S2. The raw signal includes details of the surface of the sample as well as the effect noise due to vibration in the apparatus 200. FIG. 3B illustrates the signal from the sensor 206. When the displacement signal S3 is subtracted from the raw signal details of the surface may be more readily distinguished from the difference (S2–S3) as illustrated in FIG. 3C.

In some embodiments, the displacement signal S3 may be filtered, before combination with the adjustment signal S2. To this end, the apparatus 200 may optionally include a filter 224 coupled to the sensor 206. The filter output S5 may be coupled to the combiner 222. The filter 224 may be an analog filter or digital filter. As used herein, a digital filter includes stand-alone devices such as a digital signal processor (DSPs) or application specific integrated circuit (ASIC) as well as general-purpose computers programmed with software to implement the digital filtering as a sequence of computer readable instructions. The filtering may take on other different forms. For example, the filter 224 may limit the bandwidth of the vibration signal. By way of example, the filter 224 may be a bandpass, lowpass highpass, or notch filter. The filter 224 may also implement gain filtering or other manipulations. In some embodiments, an optional filter 226 may be connected between the combiner and the compensation mechanism 218 to filter the combination signal S4.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A surface analysis apparatus, comprising:
a probe of a type that provides a probe signal that depends on the distance of said probe from a surface of a sample;
a sensor of a type that produces a sensor signal related to the relative displacement of the probe from the surface of the sample, wherein the sensor is relatively insensitive to properties measured by the probe; and
a processing system adapted to use the sensor signal to compensate for noise in the probe signal whereby the noise in the probe signal will be reduced as a result of the compensation using the sensor signal.

2. The apparatus of claim 1, wherein the sensor is a capacitance sensor, an optical sensor, or an interferometric sensor.

3. The apparatus of claim 1, further comprising a scanning mechanism that displaces said sample and said probe relative to each other.

4. The apparatus of claim 1 wherein the probe is an atomic force microscope probe, an electron tunneling microscope probe, an optical tunneling microscope probe, or a van der Waals microscope probe.

5. The apparatus of claim 1 wherein the probe and the sensor are mounted to a probe head.

6. The apparatus of claim 1, further comprising a compensation mechanism coupled to the probe and/or sample that changes a distance between said sample.

7. The apparatus of claim 6 wherein the compensation mechanism is driven independent of a signal from the probe.

8. The apparatus of claim 6 wherein the compensation mechanism is driven in response to a signal from the probe.

9. The apparatus of claim 6, further comprising:
a combiner having first and second inputs and an output, the combiner being of a type that produces at said output an output signal that is a combination of signals applied to said first and second inputs; and
wherein the first input is coupled directly or indirectly to said probe,
wherein said second input of said combiner is coupled directly or indirectly to said sensor,
wherein the output of said combiner is coupled to said compensation mechanism.

10. The apparatus of claim 9 further comprising a filter coupled between the output of the combiner and the compensation mechanism.

11. The apparatus of claim 9, further comprising a filter coupled to said sensor, the filter having an output coupled to said second input of said combiner.

12. The apparatus of claim 11 wherein the filter is an analog filter.

13. The apparatus of claim 11 wherein the filter is a digital filter.

14. A method for compensating for mechanical vibrations and/or drift in a surface analysis instrument having a probe, the method comprising the steps of:
measuring a probe signal with the probe, wherein the probe signal depends upon a distance between the probe and a sample surface;
measuring a sensor signal with a sensor of a type that measures a relative displacement between the probe and the surface of the sample, wherein the sensor is relatively insensitive to properties measured by the probe; and
using said sensor signal to compensate for noise in said probe signal whereby the noise in the probe signal will be reduced as a result of the compensation using the sensor signal.

15. The method of claim 14 wherein using said displacement signal to compensate for noise includes measuring the displacement signal while measuring the probe signal; and correcting the probe signal based on the measured displacement signal.

16. The method of claim 14 wherein using the displacement signal to compensate for noise includes maintaining the probe in a substantially constant displacement relative to the sample surface.

17. The method of claim 14 wherein using said displacement signal to compensate for mechanical vibrations and/or drift includes generating an adjustment signal from said probe signal and subtracting said displacement signal from said adjustment signal.

18. The method of claim 14 wherein the probe and the sensor are mounted on a probe head.

19. The method of claim 14, further comprising filtering said sensor signal.

20. The method of claim 19 wherein filtering said sensor signal includes analog filtering.

21. The method of claim 19 wherein filtering said sensor signal includes digital filtering.

22. The method of claim 14 wherein using the displacement signal to compensate for noise includes combining said probe signal with said displacement signal to produce a combination signal.

23. The method of claim 22 wherein the displacement signal and probe signal are combined in real time.

24. The method of claim 22 further comprising filtering the combination signal.

25. The method of claim 22 wherein combining said probe signal with said displacement signal includes subtracting said displacement signal, or a function thereof, from said probe signal, or a function thereof.

* * * * *